Dec. 2, 1969  F. A. DAVIS, JR  3,481,051
HEATING APPARATUS
Filed Feb. 6, 1969  2 Sheets-Sheet 1
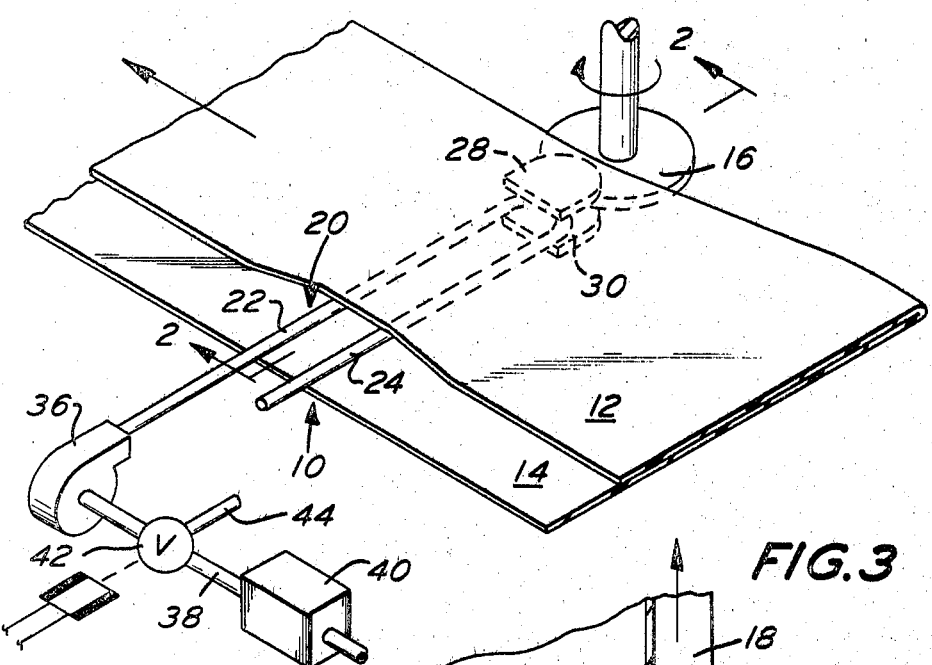
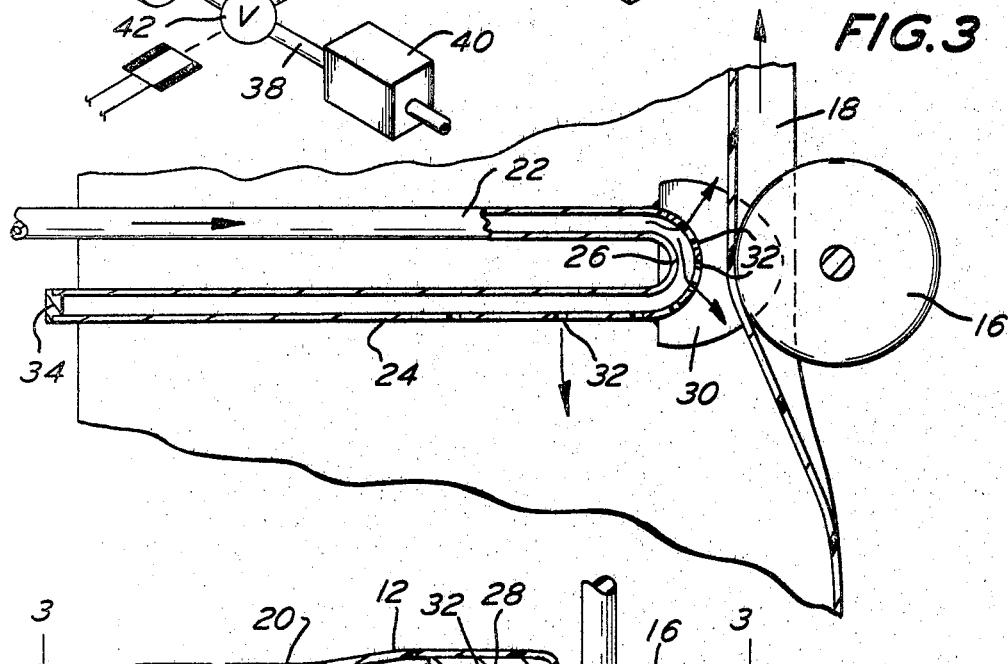
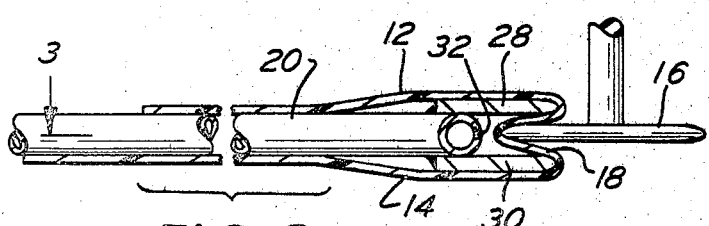
INVENTOR
FRANCIS A. DAVIS, JR.
BY Seidel & Gonda
ATTORNEYS.

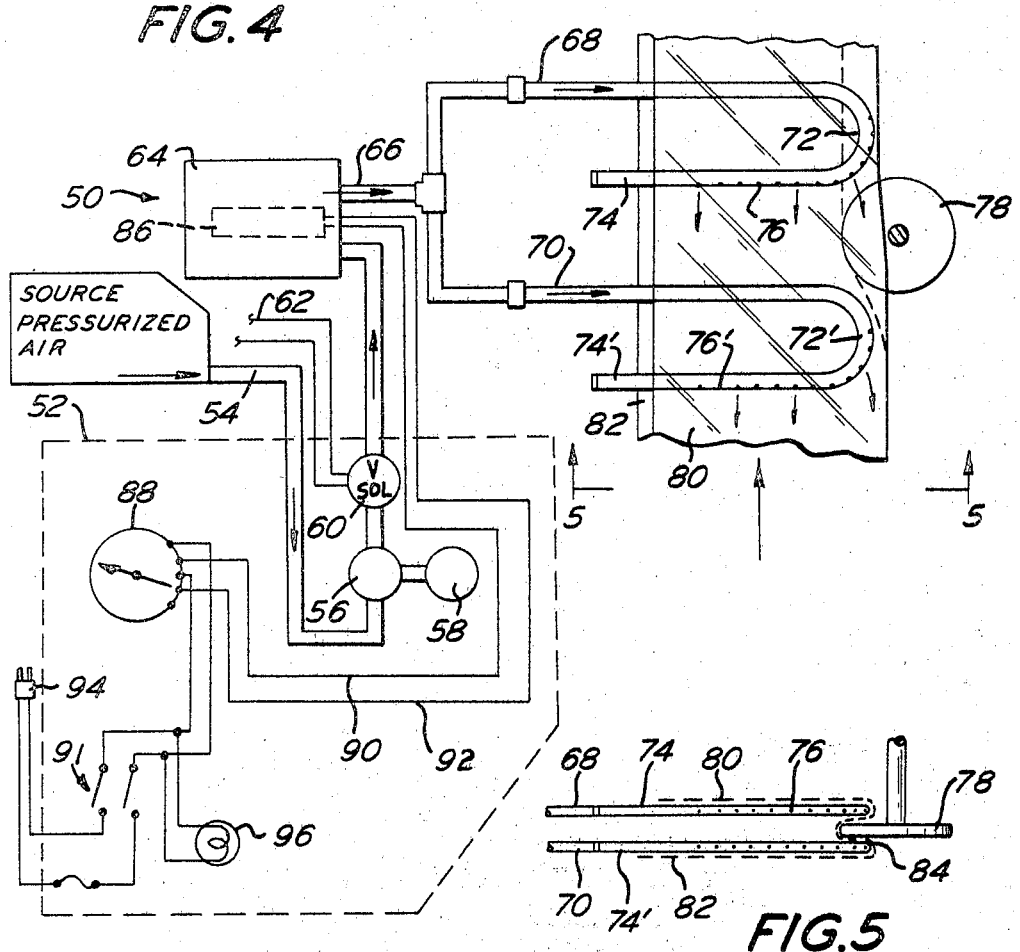
FIG. 4
FIG. 5
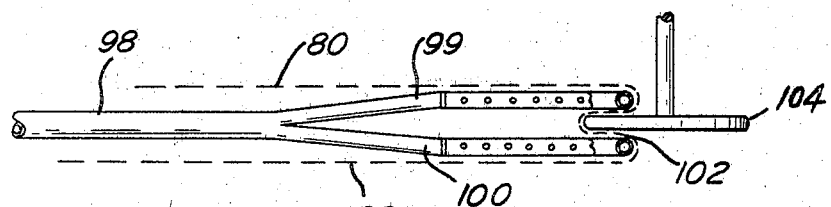
FIG. 6
INVENTOR
FRANCIS A. DAVIS, JR.
BY
Seidel & Gonda
ATTORNEYS.

United States Patent Office 3,481,051
Patented Dec. 2, 1969

3,481,051
HEATING APPARATUS
Francis A. Davis, Jr., Lansdale, Pa., assignor to Paramount Packaging Corp., Chalfont, Pa., a corporation of Delaware
Continuation-in-part of application Ser. No. 629,643, Apr. 10, 1967. This application Feb. 6, 1969, Ser. No. 802,318
Int. Cl. F26b 3/02, 13/02, 13/10
U.S. Cl. 34—162
13 Claims

ABSTRACT OF THE DISCLOSURE

Heating apparatus is provided for preheating top and bottom layers of thermoplastic sheet material by introducing heated air between the layers particularly directed toward the location where the layers are joined together and provided with a gusset fold.

---

This application is a continuation-in-part of my copending and now abandoned application Ser. No. 629,643 filed Apr. 10, 1967.

This invention relates to heating apparatus, and more particularly to apparatus for preheating the layers of thermoplastic sheet material prior to cutting and welding the sheet material to form bags. When forming gusset bottom bags, adjacent the bottom the bag will have four layers welded together whereas the remainder of the bag will have only two layers welded together. The speed with which the bags may be cut and the side edges welded together is dictated by the number of layers which are cut. When making gusset bottom bags, four such layers are provided.

In accordance with the present invention, the gusset bottom of the overlapping layers is preheated by introducing heated air into the space between the layers adjacent the gusset bottom. As a result of introducing air preheated to a temperature of about 150°, I have found that the production of bags can be increased from 110 to 180 bags per minute.

It is an object of the present invention to increase the rate of production of thermoplastic side-welded bags by preheating the gusset bottom.

It is another object of the present invention to provide a novel heating apparatus for preheating the space between overlapping layers of thermoplastic material and the area wherein the layers are joined together.

It is another object of the present invention to provide a thermoplastic sheet preheater which will enable gusset bottom bags to be made at the same rate as flat bottom bags, notwithstanding the fact that a gusset bottom bag involves welding four layers of material.

Other objects will appear hereinafter.

For the purpose of illustrating the invention, there is shown in the drawings a form which is presently preferred; it being understood, however, that this invention is not limited to the precise arrangements and instrumentalities shown.

FIGURE 1 is a perspective view of the heating apparatus of the present invention.

FIGURE 2 is a sectional view taken along the line 2—2 in FIGURE 1.

FIGURE 3 is a view taken along the line 3—3 in FIGURE 2.

FIGURE 4 is a diagrammatic plan view of another embodiment of the heating apparatus of the present invention.

FIGURE 5 is a sectional view taken along the line 5—5 in FIGURE 4.

FIGURE 6 is a partial side elevation view of still another embodiment of the heating apparatus of the present invention.

Referring to the drawing in detail, wherein like numerals indicate like elements, there is shown in FIGURE 1 a heating apparatus in accordance with the present invention designated generally as 10. The heating apparatus 10 is partially disposed between a top layer 12 and a bottom layer 14 connected together by a gusset fold 18 imposed upon the material by a gusset wheel 16. The layers 12 and 14 are formed from a single sheet of thermoplastic heat-sealable material such as polyethylene having a thickness of approximately .0005 to .0015 inch.

The portion of the heating apparatus 10 which extends between the layers 12 and 14 includes a generally U-shaped tube 20 having legs 22 and 24 joined together at a bight 26. Generally semi-circular pads 28 and 30 are fixedly secured on opposite sides of the bight 26. The wheel 16 extends into the space between the pads 28 and 30 but is spaced from the bight 26 as shown more clearly in FIGURE 3.

A plurality of holes 32 are provided in the outer peripheral wall of the bight 26 and leg 24. The holes 32 are more numerous in the bight 26 than in the leg 24. The holes 32 in the leg 24 are directed so as to permit hot air to be introduced in a direction upstream of the movement of the layers 12 and 14. The layers 12 and 14 are driven by mechanisms not shown in the direction of the arrow in FIGURE 1. The free end of leg 24 is closed by a plug 34.

The free end of leg 22 communicates with a pump 36 having an intake conduit 38. A heater 40 is provided for the intake conduit 38. Heater 40 may be a steam heat exchanger or an electrical heat exchanger. Heater 40 is preferably designed so as to preheat air to a temperature of approximately 150° when using polyethylene having a thickness of .001 inch. The temperature to which the air will be preheated will vary with the thermoplastic material and the thickness of the same.

A solenoid operated valve 42 is provided in conduit 38. Valve 42 is a multiple inlet-outlet valve. One of the inlets of valve 42 is in communication with a conduit 44 which communicates with atmosphere.

The apparatus of the present invention illustrated in FIGURES 1–3 is utilized as follows:

Overlapping layers 12 and 14 are moved by mechanisms not shown in the direction of the arrow in FIGURE 1. A gusset fold 18 is provided by wheel 16. The four layers of the material illustrated at the righthand end of FIGURE 2 are preheated by air introduced through the leg 22 and permitted to escape through the apertures 32. The air is introduced at a pressure such as 35 pounds per square inch gauge.

When such preheated layers are cut into side weld bags, I have found that the normal production rate of 110 bags per minute can be increased up to 180 bags per minute. Thus, gusset bottom bags having four layers to be welded together can now be made at the same rate as flat-bottomed bags where only two layers are welded together. When the machine is inoperative and no cutting is taking place, the output pressure of the pump 36 is preferably reduced to about 10 p.s.i. gauge, and valve 42 is operated so as to place the pump intake in communication with atmosphere by way of conduit 44. As a result thereof, air at 10 p.s.i. gauge and room temperature will be introduced into the space between the layers 12 and 14. Suitable friction thermocouples, not shown, may be utilized to control the heater 40 so as to maintain the proper temperature of the air introduced into the space between the layers 12 and 14 adjacent the gusset fold 18.

In FIGURE 4, there is illustrated another embodiment of the present invention designated generally as 50. The apparatus 50 includes a control box 52. Compressed air from any convenient source is introduced into conduit 54. Conduit 54 is connected to an air regulating valve 56 within the control box 52. Valve 56 is provided with a conventional gauge 58. Valve 56 is adjustable to regulate and provide for a constant output pressure. The constant pressure air from valve 56 is communicated to a heater housing 64 by way of a conduit containing a solenoid valve 60. Valve 60 is controlled by conductors 62 which are connected to the machine control circuit which in turn controls movement of the thermoplastic layers of sheet material.

The heater housing 64 is provided with an outlet conduit 66. Conduit 66 is connected to branch conduits 68 and 70. Branch conduits 68 and 70 are identical. Hence, only branch conduit 68 will be described in detail with corresponding primed numerals being provided on corresponding structure of branch conduit 70.

The branch conduit 68 is provided with a return leg 74 connected thereto by a bight 72. The bight and the return leg 74 are provided with discharge holes 76 through which the heated pressurized air may be discharged toward the gusset fold 84 on the layers 80 and 82.

As shown more clearly in FIGURE 5, the elevation of bight 72 is above the elevation of bight 72'. A wheel 78 is disposed between the elevations of the bights 72 and 72'. As shown more clearly in FIGURE 4, the wheel 78 rotates about a vertical axis which is disposed between the bights 72 and 72'.

Electrical heater cartridge 86 is disposed within the housing 64 to the air flowing therethrough. An adjustable means is provided for controlling the temperature of the heater cartridge 86. Thus, the heater cartridge 86 is connected to a variac 88 by means of conductors 90 and 92. The variac 88 is connected to a source of potential, 110 volts, 60 cycles, by means of contacts on a plug 94. The terminals on the variac 88 are coupled to the contacts on the plug 94 by conductors containing a double pole throw switch 91 with a pilot light 96 coupled across the conductors.

Apparatus 50 is adapted to perform the same function as apparatus 10 and performs in the same manner. Hence, a detailed description of operation for apparatus 50 is not deemed necessary. Apparatus 50 facilitates accurate control of the temperature of the heated air and enables the bights 72 and 72' to perform the function of the pads 28 and 30 while at the same time directing the heated air directly at and closer to the fold lines of the gusset fold 84. When the type of thermoplastic material being processed is changed or the thickness of the material is changed, or due to environment temperature changes, control of the temperature of the heated air is effected by adjusting variac 88.

In FIGURE 6, there is illustrated another embodiment of the present invention which is identical with apparatus 50 except as will be made clear hereinafter. In FIGURE 6, a conduit 98 comparable to conduit 66 is provided with branch conduits 99 and 100 which are disposed directly one above the other. Branch conduits 99 and 100 are identical with the branch conduits 68 and 70. It will be noted that the bight on the branch conduits 99 and 100 is closely adjacent to the fold lines of the gusset fold 102.

The vertical distance between the branch conduits 99 and 100 is sufficient so that a wheel 104, corresponding to wheel 78, may be disposed therebetween. The return leg and bight of the branch conduits 99 and 100 are provided with holes for the discharge of heated air as described above.

The present invention may be embodied in other specific forms without departing from the spirit or essential attributes thereof.

I claim:

1. Heating apparatus for heating layers of thermoplastic heat-sealable material comprising means for folding heat-sealable thermoplastic material on itself so as to have top and bottom layers connected by a fold, a conduit having at least one aperture at an end portion thereof for discharging heated air between the layers at the fold, a source of pressurized air having its outlet communicating with said conduit, heater means for heating the air before it enters said conduit, said conduit being in the path of movement of the material and positioned so that it is between the layers so that heated air from the aperture is directed toward the fold inner surface.

2. Apparatus in accordance with claim 1 wherein said conduit end portion is curved, said curved end portion having a plurality of said apertures on its outer periphery.

3. Apparatus in accordance with claim 1 including a gusset fold wheel, upper and lower guide surfaces on said conduit end portion, said wheel extending between said surfaces in a manner so that material may pass between said surfaces and the outer periphery of the wheel, and said wheel being juxtaposed to said end portion so that said material may pass therebetween.

4. Apparatus in accordance with claim 1 wherein said heater means heats the air to a temperature between room temperature and about 150° F.

5. Apparatus in accordance with claim 1 wherein said folding means includes a gusset wheel lying in the same horizontal plane as said conduit, and the axis of rotation for said wheel being generally perpendicular to said horizontal plane.

6. Apparatus in accordance with claim 1 wherein said folding means includes a gusset wheel, said conduit end portion including branch conduits lying in different horizontal planes, said gusset wheel lying in a horizontal plane between said first-mentioned planes so as to cooperate with the end portions of said branch conduits to form a gusset fold in said thermoplastic material.

7. Apparatus in accordance with claim 6 wherein said branch conduits are disposed one above the other.

8. Apparatus in accordance with claim 6 wherein said branch conduits are longitudinally spaced from one another with the axis of said gusset wheel lying between the branch conduits.

9. Apparatus in accordance with claim 1 wherein said heater means includes a heater housing between the source of pressurized air and said conduit, said housing containing a heater cartridge, and a variac coupled to said heater cartridge for adjusting the temperature thereof.

10. Apparatus in accordance with claim 1 wherein said conduit end portion is U-shaped, the bight and one of the legs of the conduit end portion having said apertures therein, with the number of the apertures in said bight being greater than the number of apertures in said one leg.

11. Heating apparatus for heating layers of thermoplastic heat-sealable material comprising means capable of being disposed in the path of movement of layers of thermoplastic heat-sealable material and positionable so that it is between the layers for cooperation with means for folding the thermoplastic material on itself so as to have the top and bottom layers connected by a fold, said first means including a conduit which is U-shaped, the bight and one leg of said conduit having apertures for discharging air between the layers at the fold, and means for heating air before it enters said conduit.

12. Apparatus in accordance with claim 11 wherein said conduit has first and second branch conduits disposed at different elevations with each branch conduit being U-shaped.

13. Heating apparatus for heating the layers of thermoplastic heat-sealable material comprising a conduit having apertures at one portion thereof for discharging heated air at layers of thermoplastic material, a pump having its outlet communicating with said conduit, heater means for heating air communicating with said pump intake, valved conduit means for bypassing said heater means so that air at room temperature may be introduced into said pump when desired, means for folding said material, said folding means being positioned so that the folded material may pass adjacent said apertures.

References Cited

UNITED STATES PATENTS

| | | | |
|---|---|---|---|
| 2,587,422 | 2/1952 | Willis | 156—497 |
| 3,239,402 | 3/1966 | Ecklund et al. | 156—202 X |
| 3,257,735 | 6/1966 | Catallo | 34—21 |

EDWARD J. MICHAEL, Primary Examiner

U.S. Cl. X.R.

156—497